United States Patent [19]

Häfner et al.

[11] Patent Number: 4,913,457

[45] Date of Patent: Apr. 3, 1990

[54] METHOD AND APPARATUS FOR OPTIMIZING THE DRIVING CHARACTERISTICS OF A VEHICLE

[75] Inventors: Hans W. Häfner, Aichach; Reinhard Drews, Ahornweg, both of Fed. Rep. of Germany

[73] Assignee: Pfister GmbH and Bayrische Motoren Werke AG, Fed. Rep. of Germany

[21] Appl. No.: 267,329

[22] Filed: Nov. 4, 1988

[30] Foreign Application Priority Data

Nov. 6, 1987 [DE] Fed. Rep. of Germany ....... 3737760

[51] Int. Cl.⁴ .............................................. B60G 17/00
[52] U.S. Cl. ..................................... 280/707; 280/840
[58] Field of Search ............... 280/707, 611, 689, 703, 280/840, 6.1, 6.11, 709; 267/166; 180/41

[56] References Cited

U.S. PATENT DOCUMENTS

| | | | |
|---|---|---|---|
| 4,754,653 | 7/1988 | Hafner, et al. | 73/862.68 |
| 4,776,610 | 10/1988 | Moog | 280/707 |
| 4,779,895 | 10/1988 | Rubel | 280/707 |
| 4,830,399 | 5/1989 | Hafner | 280/707 |

FOREIGN PATENT DOCUMENTS 2097344 11/1982 United Kingdom .

OTHER PUBLICATIONS

One paged reference from journal "Technology", Oct. 17, 1983.

Primary Examiner—Richard A. Bertsch
Attorney, Agent, or Firm—Lowe, Price, LeBlanc, Becker & Shur

[57] ABSTRACT

For optimizing the driving characteristics of a vehicle, especially a motor vehicle, there is proposed a method and an apparatus, wherein the monetary wheel-load is preferably continuously determined and the level of the car body and/or the damping-characteristics of a shock-absorber are regulated in dependence of these signals of momentary wheel load, which is continuously determined by a single force-measuring-cell integrated in each of the shock-absorbers.

24 Claims, 2 Drawing Sheets

METHOD AND APPARATUS FOR OPTIMIZING THE DRIVING CHARACTERISTICS OF A VEHICLE

FIELD OF THE INVENTION:

The invention relates to a method and an apparatus for optimizing the driving characteristics of vehicles.

BACKGROUND OF THE INVENTION:

U.S. Pat. No. 4,830,399 (issued May 16, 1989) discloses a method for optimizing the operating characteristics of vehicles, especially of cars or trucks wherein the forces and/or moments acting on the vehicle or on parts thereof, respectively, are measured by devices integrated in elastic connections of the vehicle. The results of the measurements are processed and the operating characteristics of the vehicle are optimized on the results of the processing, for example, the suspension, attentuation and/or the clearance of the car body above ground is/are adjusted and regulated. The force measuring devices are integrated in the connecting joints of the spring supports of the vehicle between the shock absorber and the car body, the flanges of the force measuring device being fixed to the shock absorber and the car body with several screws.

The British laid open publication No. 81 10 972 (which serves as a priority document for British Patent Application No. 2097344 to Brearley) discloses a suspension with automatic level control for a vehicle, wherein a sensor is used to measure the level or height of the car body of the vehicle above ground. If the level differs from a reference value there are actuated two seperate hydraulic chambers provided at the suspension units to lift or lower the car body of the vehicle. This system requires extra special level sensors and separate hydraulic chambers in addition to the spring/shock absorber unit, thus raising the expense of this system.

The known so-called Lotus system does not use mechanical springs anymore but a hydraulic device as shock absorber and spring support of the car body. It uses a double-acting hydraulic cylinder fitted with a force measuring sensor and an extra level sensor and a level adjusting means controlled by a servo valve getting the information from a hybrid analog/digital computer. Furthermore, the suspension of each wheel requires an accelerating sensor, so that this construction with three sensors at each wheel is very complicated. Security makes it necessary to provide each wheel with a basic light spring to support the chassis in case of a motor deficiency or loss of pressure.

SUMMARY OF THE INVENTION:

It is a principal object of the invention to provide a method for optimizing the driving characteristics of a vehicle.

It is a further object of the instant invention to provide a method and an apparatus for optimizing the driving characteristic of a vehicle by which the clearance-above-ground and/or the damping characteristics of the suspension of the vehicle may be set and controlled by simple means.

It is a further object of the instant invention to provide a method and an apparatus for optimizing the driving characteristic of a vehicle enabling a flexible and fast-reacting regulation of the level of a car body of a vehicle and/or the damping-characteristics of a suspension thereof by a simple construction, especially with a reduced number of elements.

These and other objects are achieved by a method for optimizing the driving characteristics of a vehicle, especially a motor vehicle, comprising the steps of:
providing a suspension spring/shock absorber unit for each of a plurality of wheels of said vehicle between a car body and axles of said vehicle between the vehicle body and axles of said vehicle;
integrating a force measuring device in each of said suspension spring/shock absorber unit;
determining a momentary wheel load force acting on each of said wheels by means and generating a corresponding signal of said force measuring means;
adjusting the damping characteristics of a shock absorber of the suspension spring/shock absorber unit in dependence on the signals generated by the force measuring means when the vehicle is in motion;
According to a further aspect of the invention there is provided an apparatus for optimizing the driving characteristics of a vehicle, especially of a motor vehicle, comprising: a suspension spring/shock absorber unit provided for each of a plurality of wheels of said vehicle arranged between the vehicle body and axles of said vehicle;
a force measuring means integrated in each of said suspension spring/shock absorber units for determining momentary wheel load forces acting on said wheels and for generating oscillation signals corresponding thereto; and
means for adjusting damping characteristics of the suspension spring/shock absorber units in dependence on the oscillation signals while the vehicle is in motion.

The invention uses in an advantageous way the existing force-measuring sensor used to determine of the wheel load also for the determination of the clearance above ground while the vehicle is in a resting position and/or while driving. Thus no additional level sensors like displacement transducers or acceleration sensors are necessary. The force measuring device may be fixed at the shock-absorber in a very simple way without screwing elements by integrating thereof into a spring/shock absorber unit. In an analogous manner the damping-characteristics can be regulated in dependence on the output signal of the force measuring sensor with the vehicle in rest or/and on the oscillations of the signals (amplitude, frequency) with the vehicle in motion, especially when using a mean value thereof.

BRIEF DESCRIPTION OF THE DRAWINGS

Embodiments of the present invention will now be described by way of example with reference to the accompanying drawings, in which.

Figure 1:
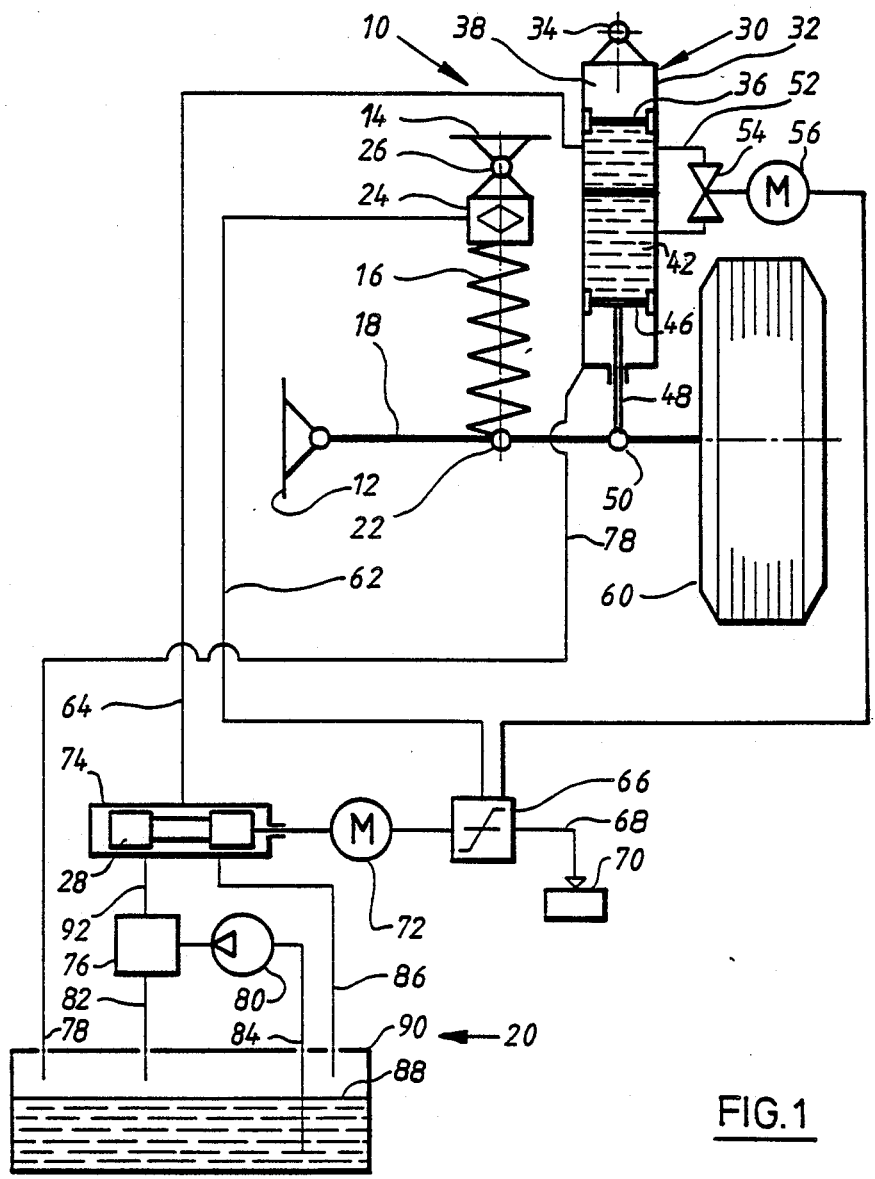
FIG. 1 is a schematic view of a spring/shock absorber unit for a wheel of a vehicle with integrated control unit.

DESCRIPTION OF THE PREFERRED EMBODIMENTS:

The schematic view of FIG. 1 shows the principle of a spring-andshock absorber-unit 10 and of a supply unit 20 for the control and adjustment of the clearance-above-ground and/or adjustement of the damping characteristics of the shock absorber. The spring-and shock absorber unit 10 consists in particular of a spring 16 linked by a joint 22 to an axle 18 supporting a wheel 60, and of a shock absorber 30 connected to the axle 18 by a joint 50. The axle 18 is linked to the chassis 12. An end of the spring 16 opposite to the joint 22 acts on a force measuring sensor 24 attached by a joint 26 at its upper part to the vehicle or body generally designated by reference numeral 14.

Furthermore, the shock absorber 30 is fixed by an upper joint 34 to the car body 14. The shock absorber 30 comprises a cylinder 32 and a first piston 36 arranged in the cylinder 32 separating an upper gas chamber 38 from a first upper hydraulic pressure chamber 40. Below the upper hydraulic pressure chamber 40 a second lower hydraulic pressure chamber 42 is formed seperated by a partition wall 44 which is fixedly arranged in the preferred embodiment, from the upper hydraulic pressure chamber 40. The lower hydraulic pressure chamber 42 is sealed by a second piston 46, movable in longitudinal direction and connected to the joint 50 connected to the axle 18 by a piston rod 48.

Bypassing the partition wall 44 the upper hydraulic pressure chamber 40 is connected to the lower hydraulic pressure chamber 42 by a line 52 including a throttle valve 54, the passage cross-section of which is adjustable by a setting motor 56. Hydraulic liquid leaking from the lower hydraulic pressure chamber 42 is removed via a line 78 into a tank 90 for hydraulic liquid. Via a supply line 84, hydraulic liquid is supplied by a pump 80 through a pressure adjusting device 76 from the tank 90 to a level adjusting device 74 connected to the upper hydraulic pressure chamber 40 by a pressure line 64. Any overpressure produced by the pump 80 is compensated for by bleeding of fluid via a discharge line 82 from the pressure adjusting device 76 into the tank 90.

A piston 28 in the level adjusting device 74 is movable by a motor 72 such that it either closes the inlet line 92 of the pressure adjusting device 76 or opens it fully or partially for supplying hydraulic liquid to the pressure line 64. The motor 72 is activated by a level control device 66 to operate in one or the other direction in dependence o the desired level set at a level setting device 70, as a potentiometer, and applied to the level control device 66 through a lead 68. Furthermore, the actual value of the force corresponding to the wheel load is applied to the level control device 66 through line 62 from the force measuring sensor 24. The level control device may be of well known design generating an energizing signal for the motor 72 as long as the value of the signal supplied from the force measuring device 24 and the value of the signal generated by the level setting device 70 have not reached a predetermined relation and, specifically, are not equal.

It should be noted,that in-the schematic view of FIG. 1 the unit 66 is only shown as an activating device for the motors 72, 56. The unit 6 may also be a general control means, e.g., a board computer initiating various controls in dependence on the signal of various force measuring sensors 24, as it is explained in the above mentioned U.S. Pat. No. 4,830,399.

The motor 56 is adjusting the through-put cross section of the throttle valve 54 depending on the amplitude of and frequency of the oscillational signals from the force measuring devices 24 in order to adjust the desired damping response of the apparatus.

The principal operation of the apparatus according to FIG. 1 is as follows.

When the vehicle is in a rest position, the force measuring sensor 24 provides a signal to the adjusting device 66 corresponding to the force acting on the wheel 60. As the characteristic of the spring 16 is known, the force acting on the wheel is correlated with the corresponding clearance of the car body 14 above ground. The level setting device 70 is preferably calibrated according to the ground clearance of the car body. When a certain clearance-above-ground is set at the level setting device 70, the motor 72 is energized by the level adjusting device 74 and hydraulic liquid 88 is fed into or out of the upper hydraulic pressure chamber 40 through the level adjusting device 74 and the pressure line 64 (and discharged back by the discharge line 86 into the tank 90) until the car body has attained the desired clearance above ground.

Furthermore the motor 56 may be energized manually or in dependence of the wheel load measured by the force measuring sensor(s) 24, whereby the throttle valve 54 is closed more or less. This results in a corresponding adjustment of the damping characteristics of the shock absorber 30, as the cross section of the throttle valve 54 determines the quantity of hydraulic liquid 88 that is passing during a certain period from the upper hydraulic pressure chamber 40 to the lower hydraulic pressure chamber 42 vice versa. The total quantity of hydraulic liquid contained in the chambers 40 and 42 determines the clearance-above-ground of the car body. When supplying additional hydraulic liquid through the pressure line 64 hydraulic liquid passes from the upper to the lower hydraulic pressure chamber and the piston 46 is displaced downwards. This means a lifting up of the car body 14.

This kind of adjustment is not limited to the situation where the vehicle is at rest, and may be used as well when the vehicle is in motion. The adjustment of the clearance-above-ground will then be based on an average value derived from the continuously and periodically determined wheel load forces. Furthermore, an adjustment of the damping characteristics of the shock absorber by means of the throttle valve 54 is made in dependence on the oscillations (amplitude of frequency) of the car body which are evaluated as electric signals from the force measuring sensor(s) 24.

It should be appreciated that an absolute velocity measurement is possible by correlating the signals from the force measuring sensors of the front wheels and those from the rear wheels as described in more detail in the U.S. patent application Ser. No. 204,328. This means that in contrast to the known suspension systems, it is not necessary to add further velocity or acceleration measuring devices.

The schematic view of FIG. 1 serves to explain the principle of the invention. The spring and shock absorber unit, shown in FIG. 1 as two seperate elements, can be implemented in various ways. The most advantegeous solutions with some modifications are explained below by referring to FIGS. 2 and 3.

At first, it should be noted that the application of this spring and shock absorber unit in the automobile field provides a high level of safety, with a remarkable reduction is maintenance and a considerable extension of life time connected with a considerable cost reduction.

Figure 2:
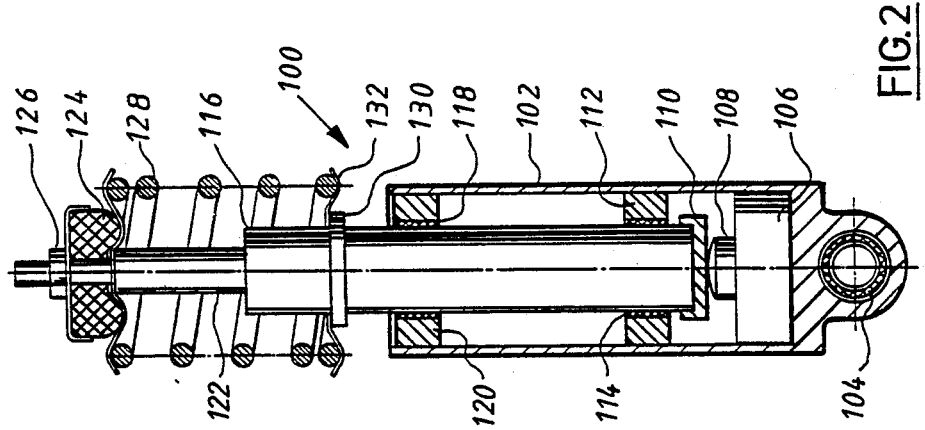
FIG. 2 is a first embodiment of a combined spring/shock absorber unit with a mechanical spring.

FIG. 2 shows a spring and shock absorber unit 100 according to a first embodiment of the invention.

The spring and shock absorber unit 100 comprises a compact coaxial design with an integrated force measuring sensor 106. Thus, the force-measuring sensor is arranged at the lower end of a cylindrical housing 102, the connection to the car body is made in form of a vibration absorber 104 to the joint 50 connected to the axle 18 (FIG. 1). At the bottom of the housing 102 the force measuring sensor 106 is provided which may preferably be a force measuring sensor according to U.S. Pat. No. 4,754,653. By this compact design a very simple connection without any screws or flanges is achieved. A cylindrical tube 116 is acting via a pressure cap 110 onto the force introduction head 108 of the force measuring sensor 106. The cylindrical tube 116 is fixed in upper and lower rings, 120 and 112, respectively, surrounded by elastomeric material 118 and 114, respectively.

The interior of the cylindrical tube 116, in principle, has the same design as the interior of the shock absorber of FIG. 1. In particular, there might be provided a gas chamber 38 in the lower part closed by a laterally sealed piston 36. Above the hydraulic pressure chambers 40 and 42, seperated by the partition 44, there is again provided the piston 46 connected to a piston rod 122 (FIG. 2) corresponding to the piston rod 48 in FIG. 1. It should be noted, that the arrangement in FIG. 2 is reversed to that of FIG. 1, in order to show that the top and bottom ends are exchangeable.

As a transition to the car body, the end of the piston rod 122 is reduced in cross section and is connected by a nut 126 to a vibration absorber 14 consisting in two leaf springs sandwiching a piece of rubber. In the upper part of the cylindrical tube 116, outside of the housing 102, the cylindrical tube has a ring 130, on which one end of a spring 128 is supported by a base plate 132 while the other end of said spring urges against the vibration absorber 124.

It should be noted that the interior of the cylindrical tube 116 is not shown in detail because various known constructions are applicable, like the one explained in the above mentioned report in VDI-nachrichten or the one used by Lotus-system. The essential point of the invention consists in the compact combinational coaxial system of the spring and shock absorber unit and in the regulation of the clearance-above-ground and of the damping characteristics by the use of only one integrated force measuring unit 106, measuring both the wheel load, the generated signals being used in various ways for optimizing the driving characteristics of the vehicle, in particular including the regulation of the clearance-above-ground and the adjustment of the damping characteristics.

Figure 3:
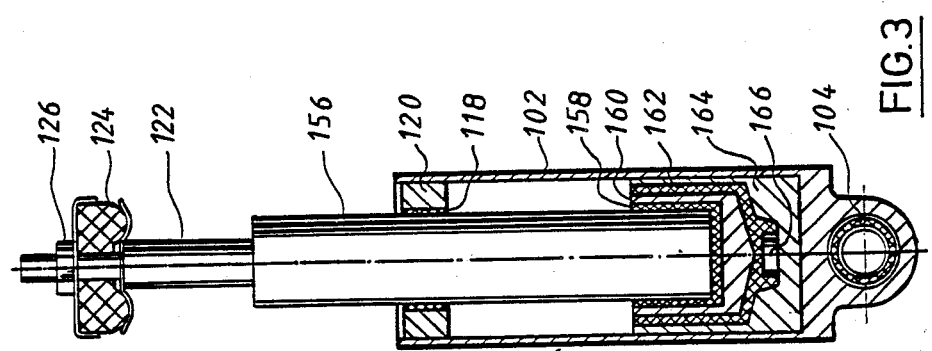
FIG. 3 is a second embodiment of a combined spring/shock absorber unit without mechanical springs.

FIG. 3 shows a second embodiment of a spring-and-shock absorber unit 150 with an especially high degree of integration. There is no compression spring 128 as in the example of FIG. 2, but there is used a completely hydraulic spring and shock absorber system, similar to that of the already mentioned Lotus-system, however, without the additional level sensor and without the additional acceleration sensor, the signals supplied by the force measuring sensor being used in several ways. As far as the elements of FIG. 3 correspond to the elements of FIG. 2, the same reference numerals are used in FIG. 3 as in FIG. 2 and hence there is no further description thereof.

The embodiment of FIG. 3 is characterised by a high degree of integration of the force measuring sensor in the spring and shock absorber unit. As illustrated in FIG. 3 a potlike base part 164 is arranged on the bottom of the housing 102 in rotational symmetry about the central longitudinal axis. A cylindrical sleeve 160 is inserted into the potlike base part 164, forming a narrow gap therebetween, whereby the gap and the bottom of the base part are filled with bubblefree elastomeric material 162, which adheres at the metallic surfaces of the base part 164 and of the sleeve 160, in particular by vulcanization. A cylindrical shock absorber tube 156 is inserted in a concentric recess in the sleeve 160, again surrounded by elastomeric material 158.

In the base part 164, a pressure sensor 166 is arranged in contact with the elastomeric material 162, receiving the pressure on the shock absorber tube 156 and transforming it into electrical signals. The signals are supplied to the control unit of the vehicle, in particular to the control device 66 (see FIG. 1) or to a board-computer.

It should be noted, that the integrated potlike design of the force measuring cell has a high stability in respect of lateral forces, which are shunted by the elastomeric material 158 and 162, respectively, to the base part 164.

Another simplification would be achieved by forming the lower end of the shock absorber tube 156 as sleeve 160 with direct force-introduction through the elastomeric material 162 onto the pressure sensor 166. In this context reference is made to the initially mentioned U.S. Pat. No. 4,830,399 which shows various possibilities of integration of force measuring cells in spring systems or other connection parts of a vehicle. On the other hand, the force measuring cell 106 may be replaced by other well-known force measuring devices.

In the context of the method according to the invention it should be noted that, for compensating temperature influences corresponding correction values in respect of the spring characteristics of the spring 16 and the hydraulic spring shown in FIG. 3, respectively, may be stored in the central control unit, as 66. Thus, the accuracy of the measurement is considerably improved, resulting in a considerable further improvement of the control of the driving characteristics of the vehicle.

Another modification of the spring and shock absorber unit consists in the possibility to control or vary the gas pressure in the chamber 38 in order to adjust the level of the vehicle.

Still other objects and advantages of the present invention will become readily apparent to those skilled in this art from the preceding detailed description, wherein only the preferred embodiments of the invention are illustrated and described, as aforementioned, simply by way of presenting the best modes contemplated of carrying out the invention. As will be realized, the invention is capable of other and difference embodiments, and its several details are capable of modifications in various obvious respects, all without departing from the invention. Accordingly, the drawing and description are to be regarded as illustrative in nature, and not as restrictive, the invention being defined solely by the claims appended hereto.

We claim:

1. A method for optimizing the driving characteristics of a vehicle, especially a motor vehicle, comprising the steps of:

providing a suspension spring/shock absorber unit for each of a plurality of wheels of said vehicle between the vehicle body and axles of said vehicle;

integrating a force measuring means in each of said suspension spring/shock absorber unit;

determining a momentary wheel load force acting on each of said wheels by means of said force measuring means and generating a corresponding signal; and adjusting the damping characteristics of a shock absorber of said suspension spring/shock absorber unit in dependence on said signal generated by said force measuring means when said vehicle is in motion.

2. The method of claim 1, further comprising the step of:

varying a length of each of said shock absorbers by supplying/discharging hydraulic medium to/from at least one chamber provided in said shock absorber.

3. The method of claim 2, further comprising the steps of:

generating a reference signal indicative of an adjustable desired clearance-above-ground level of said vehicle;

relating said reference signal with said signals indicative of said momentary wheel load forces at the vehicle wheels as determined by said force measuring means; and adjusting said clearance-above-ground of said vehicle until a pre-determined relation is achieved between said reference signal and said signals indicative of said momentary wheel load forces at the vehicle wheels.

4. The method of claim 1, wherein:

in said adjusting step, said damping characteristics are adjusted by changing a cross-section of a passage between two chambers provided in said shock absorbers and containing hydraulic medium.

5. The method of claim 3, wherein:

in said reference signal generating step, while said vehicle is in motion, an actual clearance-above-ground is determined by averaging said signals indicative of said momentary wheel load forces.

6. An apparatus for optimizing the driving characteristics of a vehicle, especially of a motor vehicle, comprising:

a suspension spring/shock absorber unit provided for each of a plurality of wheels of said vehicle arranged between the vehicle body and axles of said vehicle;

a force measuring means integrated in each of said suspension spring/shock absorber units for determining momentary wheel load forces acting on said wheels and for generating oscillation signals corresponding thereto; and means for adjusting damping characteristics of said suspension spring/shock absorber units in dependence on said oscillation signals generated by said force measuring means while said vehicle is in motion.

7. The apparatus of claim 6, wherein:

a shock absorber of each of said suspension spring/shock absorber units has associated therewith at least one hydraulic pressure chamber, said adjusting means controlling a quantity of hydraulic medium being supplied to/discharged from said chamber.

8. The apparatus of claim 7, further comprising:

means for generating a reference signal indicative of an adjustable desired clearance-above-ground level of said vehicle body;

means for setting into relation said reference signal with said signals indicative of said momentary wheel load forces determined by said force measuring means; and means for adjusting said clearance-above-ground of said vehicle body unit a predetermined relation is achieved between said reference signal and said signals indicative of said momentary wheel load force.

9. The apparatus of claim 6, further comprising:

means for changing a through-put cross-section of a passage provided between two chambers provided for said shock absorber and containing hydraulic medium.

10. The apparatus of claim 8, further comprising:

means for determining an actual clearance-above of said car body with said vehicle being in motion by averaging said signals indicative of said momentary wheel load forces.

11. The apparatus of claim 8, wherein:

said setting means are part of a control means controlling said adjusting means in dependence on the relationship between said reference signal and said signal indicative of said momentary wheel load force.

12. The apparatus of claim 8, wherein:

said adjusting means comprises means for increasing/decreasing a length of a shock absorber of said suspension spring/shock absorber unit until a pre-determined relation is achieved between said reference signal and said signal indicative of said momentary wheel load force.

13. The apparatus of claim 12, wherein:

said adjusting means comprises a supply for hydraulic medium connected to at least one chamber formed for said shock absorber via a hydraulic liquid feeding control means controlled by said control unit for supplying/discharging of hydraulic liquid to/from said at least one chamber in dependence on the relation between said reference signal and said signal indicative of said momentary wheel load forces.

14. The apparatus of claim 12, wherein:

said control means are connected to a through-put cross-section varying means inserted in a passage connecting two chambers provided in said shock absorber for varying damping characteristics of said shock absorber in dependence on oscillational signals received by said control means from said force measuring means whilst said vehicle being in motion.

15. The apparatus of claim 6, wherein:

said shock absorber includes two hydraulic pressure chambers separated from each other by a partition wall and having closed opposite ends thereof by a piston each one of which being resiliently supported lowed whilst the other is receiving said wheel load force.

16. The apparatus of claim 6, wherein:

said suspension spring shock absorber unit is formed as a coaxial unit comprising a shock absorber and a spring means.

17. The apparatus of claim 16, wherein:

said force measuring means is inserted in a tubelike housing and supports said shock absorber guided in the housing for longitudinal movement, said housing being connected to one of said axles or said chassis whilst the opposite end of the shock absorber is connected to said axle or said chassis, respectively, via a vibration absorber.

18. The apparatus of claim 17, wherein:
in a pot-like base region of said housing said force measuring means is integrally formed including a pressure sensor in contact with elastomeric material filled in said potlike base region and a circular gap provided between said potlike base region and a piston-like end of said shock absorber.

19. A suspension spring/shock absorber unit for supporting a car body on a chassis of a vehicle, especially a motor vehicle comprising:
a shock absorber including a cylindrical housing which at least two chambers are formed by at least one piston each shiftable in longitudinal direction of said cylindrical housing and a partition wall fixedly arranged between said pistons;
a passage means having a variable through-put cross section and connecting said two chambers;
a spring means coaxially aligned to said housing;
a tube means circumferentially surrounding at least part of said cylindrical housing; and
a force measuring means provided in the interior of a potlike closed bottom region of said tube means said cylindrical housing supporting on said force measuring means.

20. The suspension spring/shock absorber unit of claim 19, wherein:
said force measuring means is unitary formed between a lower end of said cylindrical housing and said potlike bottom region of said tube.

21. The suspension spring/shock absorber unit of claim 19, wherein:
said spring means is a purely hydraulic acting unit.

22. The suspension spring/shock absorber unit of claim 20, wherein:
the gap between said lower end and said potlike bottom region is filled with elastomeric material having a force-measuring-sensor embedded in said elastomeric material.

23. The suspension spring/shock absorber unit of claim 19, wherein:
a sleeve is inserted between said one end of said cylindrical housing and said potlike bottom region of said tube means, being interconnected by elastomeric material.

24. The suspension spring/shock absorber unit of claim 23, wherein:
said elastomeric material is filled in a bubblefree way and adheres to the adjacent surfaces.

* * * * *